United States Patent
Koike

(10) Patent No.: US 10,832,018 B2
(45) Date of Patent: Nov. 10, 2020

(54) DATA WRITING DEVICE AND PROCESSING METHOD

(71) Applicant: TOSHIBA TEC KABUSHIKI KAISHA, Tokyo (JP)

(72) Inventor: Yuki Koike, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/430,643

(22) Filed: Jun. 4, 2019

(65) Prior Publication Data

US 2020/0012827 A1    Jan. 9, 2020

(30) Foreign Application Priority Data

Jul. 5, 2018    (JP) ................. 2018-128229

(51) Int. Cl.
G06K 7/10       (2006.01)
B41J 3/407      (2006.01)
G06K 19/07      (2006.01)
G06K 19/077     (2006.01)

(52) U.S. Cl.
CPC ........ G06K 7/10128 (2013.01); B41J 3/4075 (2013.01); G06K 7/10475 (2013.01); G06K 19/0723 (2013.01); G06K 19/07773 (2013.01)

(58) Field of Classification Search
None
See application file for complete search history.

(56) References Cited

U.S. PATENT DOCUMENTS

2010/0141394 A1    6/2010  Sugiyama
2014/0035733 A1    2/2014  Yamamoto
2015/0199594 A1*   7/2015  Kuniya .............. G06K 17/0025
                                                          358/1.5

FOREIGN PATENT DOCUMENTS

JP       2018-041365 A     3/2018

OTHER PUBLICATIONS

Search Report dated Nov. 12, 2019 received in corresponding European application No. 19184375.4, 8 pages.

* cited by examiner

*Primary Examiner* — Kristy A Haupt
(74) *Attorney, Agent, or Firm* — Foley & Lardner LLP

(57) ABSTRACT

A data writing device includes a reader and a processor. The reader receives a radio wave from a wireless tag for storing a first identifier and a second identifier and measures a radio wave intensity of the radio wave received from the wireless tag. The processor determines the radio wave intensities of the radio waves received from the plurality of wireless tags by acquiring the first identifiers from the plurality of wireless tags through the reader, and determines the radio wave intensities of the radio waves received from the plurality of wireless tags. A reading threshold is set between a strongest radio wave intensity and a next strongest radio wave intensity among the radio wave intensities, and the second identifiers are acquired from the wireless tags having the radio wave intensities exceeding the set reading threshold through the reader.

18 Claims, 4 Drawing Sheets

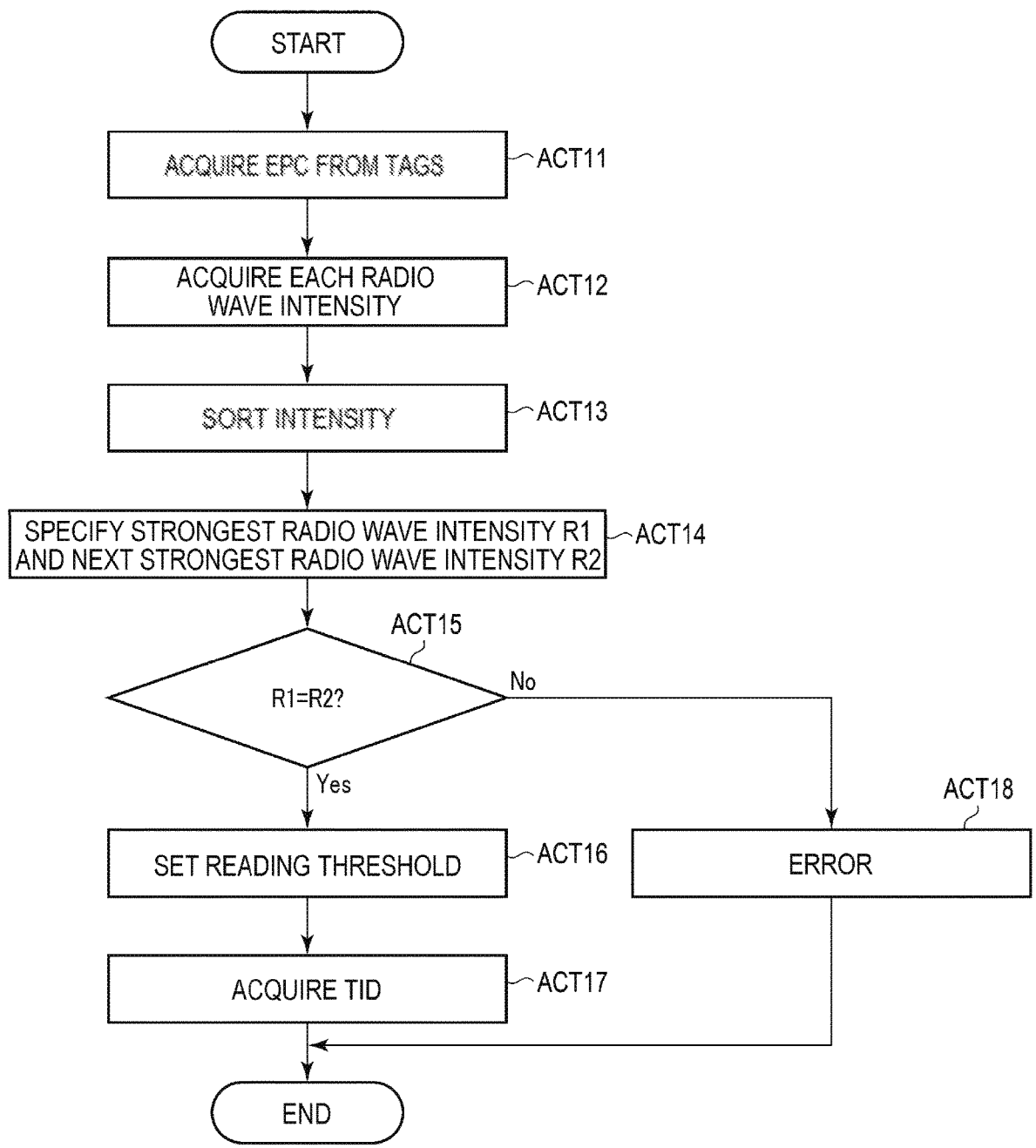

DATA WRITING DEVICE AND PROCESSING METHOD

CROSS-REFERENCE TO RELATED APPLICATION

This application is based upon and claims the benefit of priority from Japanese Patent Application No. 2018-128229, filed on Jul. 5, 2018 the entire contents of which are incorporated herein by reference.

FIELD

Embodiments described herein relate generally to a data writing device and a processing method.

BACKGROUND

Data writing devices may write data in a wireless tag, such as a radio frequency identifier (RFID). Such a data writing device sets a position (writing position) of the wireless tag suitable for transmitting and receiving the data through the reader by measuring the radio wave intensity of the wireless tag.

In order to calculate the writing position, the data writing device may measure radio wave intensities of the wireless tags by acquiring electronic product codes (EPCs) from a number of the wireless tags that are communicable through the reader. However, since the EPCs are rewritable, the data writing device may receive the same EPC from two or more of the wireless tags and cannot determine the writing position based on the EPCs.

In such case, in the related art, there is a problem that the data writing device cannot specify the wireless tag with the strongest radio wave intensity.

DESCRIPTION OF THE DRAWINGS

FIG. 2 is a diagram illustrating a configuration example of a print head and the like;

FIG. 7 is a flowchart illustrating an operation example of the data writing device.

DETAILED DESCRIPTION

Embodiments herein provide a data writing device and a processing method for effectively specifying a wireless tag with the strongest radio wave intensity.

According to one embodiment, a data writing device includes a reader and a processor. The reader receives a radio wave from a wireless tag for storing a first identifier and a second identifier and measures a radio wave intensity of the radio wave received from the wireless tag. The processor determines the radio wave intensities of the radio waves received from the plurality of wireless tags by acquiring the first identifiers from the plurality of wireless tags through the reader, and determines the radio wave intensities of the radio waves received from the plurality of wireless tags. A reading threshold is set between a strongest radio wave intensity and a next strongest radio wave intensity among the radio wave intensities, and the second identifiers are acquired from the wireless tags having the radio wave intensities exceeding the set reading threshold through the reader.

Hereinafter, embodiments will be described in detail with reference to the drawings.

A data writing device according to an embodiment sets a position (writing position) of a wireless tag suitable for storing data. The data writing device transports the wireless tag to the writing position and stores the data.

For example, the data writing device stores a label including the wireless tag. The data writing device transports the label to a predetermined position and stores the data in the wireless tag in the label. The data writing device stores predetermined data in the wireless tag based on a manipulation input by an operator or the like. The data writing device prints a predetermined image on the label. The data writing device transports the label on which the image is printed and discharges the label to the outside.

Figure 1:
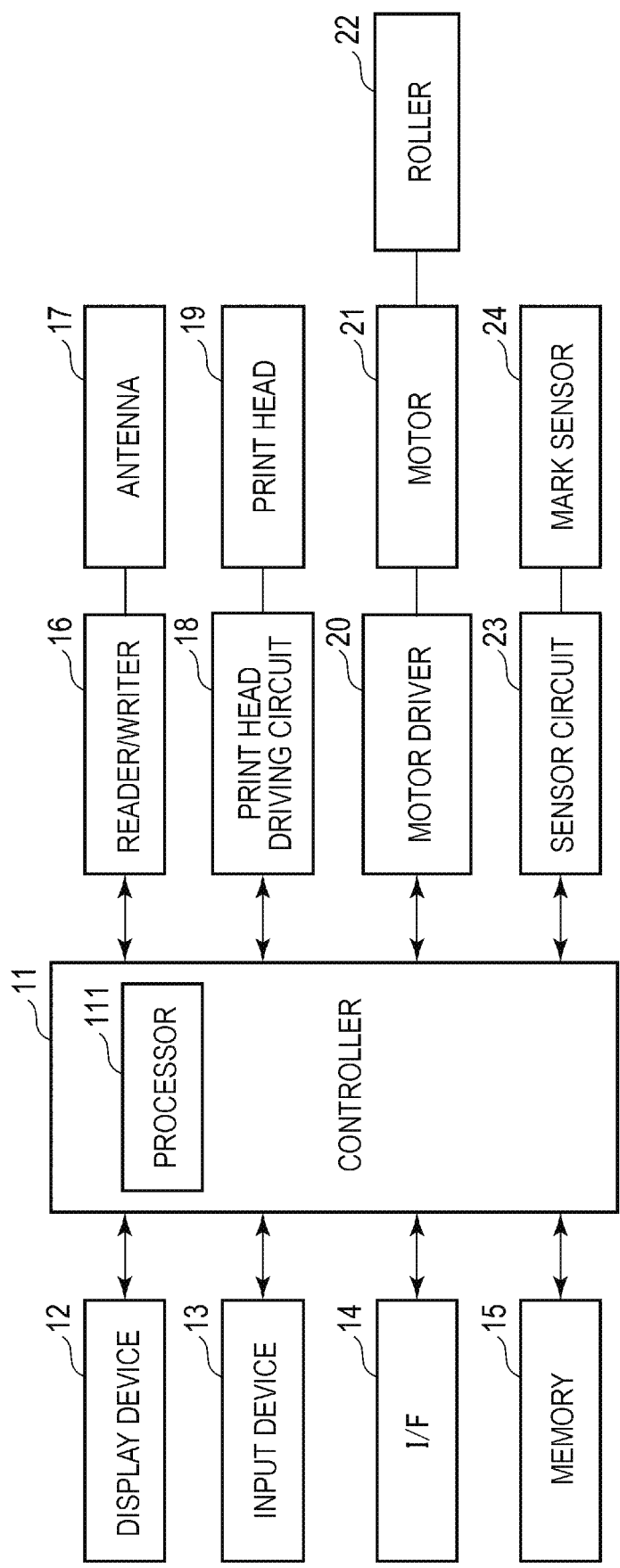
FIG. 1 is a block diagram illustrating a configuration example of a data writing device according to a first embodiment.

FIG. 1 is a block diagram illustrating a configuration example of the data writing device 1. As illustrated in FIG. 1, the data writing device 1 includes a controller 11, a display device 12, an input device 13, an interface 14, a memory 15, a reader-writer 16, an antenna 17, a print head driving circuit 18, a print head 19, a motor driver 20, a motor 21, a roller 22, a sensor circuit 23, a mark sensor 24, and the like.

The controller 11, the display device 12, the input device 13, the interface 14, the memory 15, the reader-writer 16, the print head driving circuit 18, the motor driver 20 and the sensor circuit 23 are connected to each other via a data bus or the like.

The reader-writer 16 and the antenna 17 are electrically connected to each other. The print head driving circuit 18 and the print head 19 are electrically connected to each other. The motor driver 20 and the motor 21 are electrically connected to each other. The motor 21 and the roller 22 are physically connected to each other. The sensor circuit 23 and the mark sensor 24 are electrically connected to each other.

The data writing device 1 may have a configuration as needed other than the configuration as illustrated in FIG. 1, or a specific configuration may be excluded from the data writing device 1.

The controller 11 controls the entire data writing device 1. The controller 11 includes a processor 111 and the like.

The processor 111 controls operations of the controller 11. That is, the processor 111 controls the entire data writing device 1. The processor 111 may include an internal memory, various interfaces, and the like. The processor 111 implements various processes by executing programs stored in advance in the internal memory or the memory 15 or the like.

A portion of various functions implemented by executing the program by the processor 111 may be implemented by a hardware circuit. In this case, the processor 111 controls the function executed by the hardware circuit.

The display device 12 displays various types of information under the control of the processor 111. For example, the display device 12 is configured with a liquid crystal monitor.

The input device 13 receives input of various manipulations from the operator. The input device 13 transmits a signal indicating the received manipulation to the processor 111. For example, the input device 13 is configured with a keyboard, a number pad, and a touch panel. If the input device 13 is configured with a touch panel or the like, the input device 13 may be formed integrally with the display device 12.

The interface 14 is an interface for transmitting and receiving the data to and from an external device. For example, the interface 14 transmits and receives the data to and from the external device via a network such as a local area network (LAN). For example, the interface 14 receives the data to be stored in the wireless tag from the external device. The interface 14 may be an interface that supports USB connection.

The memory 15 is a rewritable non-volatile memory. The memory 15 is configured with, for example, an SSD, a HDD, or the like. The memory 15 may store programs executed by the processor 111, control data, and the like.

The reader-writer 16 (reader) is a device that wirelessly communicates with a wireless tag 44 through the antenna 17. For example, the reader-writer 16 emits an unmodulated wave through the antenna 17. The reader-writer 16 receives a response wave to the unmodulated wave from the wireless tag through the antenna 17 and demodulates the response wave. The reader-writer 16 obtains data from the wireless tag by demodulating the response wave.

For example, the reader-writer 16 reads identification information (for example, an electronic product code (EPC)) or the like from the wireless tag. The reader-writer 16 measures the radio wave intensity from the wireless tag 44.

The reader-writer 16 transmits predetermined data to the wireless tag 44 based on a signal from the controller 11. For example, the reader-writer 16 emits a signal obtained by encoding written data and the like through the antenna 17.

The antenna 17 is an antenna for allowing the reader-writer 16 to wirelessly communicate with the wireless tag 44. For example, the antenna 17 is installed adjacent to a transport path on which the wireless tag 44 is transported. The antenna 17 may be a directional antenna having directivity in the transport path.

The print head driving circuit 18 controls the driving of the print head 19 according to a signal from the controller 11. For example, print head driving circuit 18 transmits a power signal or a control signal to the print head 19.

The print head 19 prints an image on the label including the wireless tag based on the control of the print head driving circuit 18. For example, the print head 19 is configured with an inkjet head or the like for ejecting ink droplets. The print head 19 may print a monochrome image on the label, or may print a color image on the label.

The motor driver 20 controls the driving of the motor 21 according to a signal from the controller 11. For example, the motor driver 20 transmits a power signal or a control signal to the motor 21.

The motor 21 drives the roller 22 based on the control of the motor driver 20. For example, the motor 21 is a stepping motor or the like.

The roller 22 is rotated by a driving force from the motor 21. The roller 22 transports the label in a predetermined direction by rotating.

The sensor circuit 23 controls the driving of the mark sensor 24 according to a signal from the controller 11. For example, the sensor circuit 23 transmits a power signal or a control signal to the mark sensor 24.

The mark sensor 24 reads the mark formed on a label roll paper. The mark sensor 24 transmits a predetermined signal to the sensor circuit 23 when the mark is read. For example, the mark sensor 24 is an optical sensor or the like.

Figure 2:
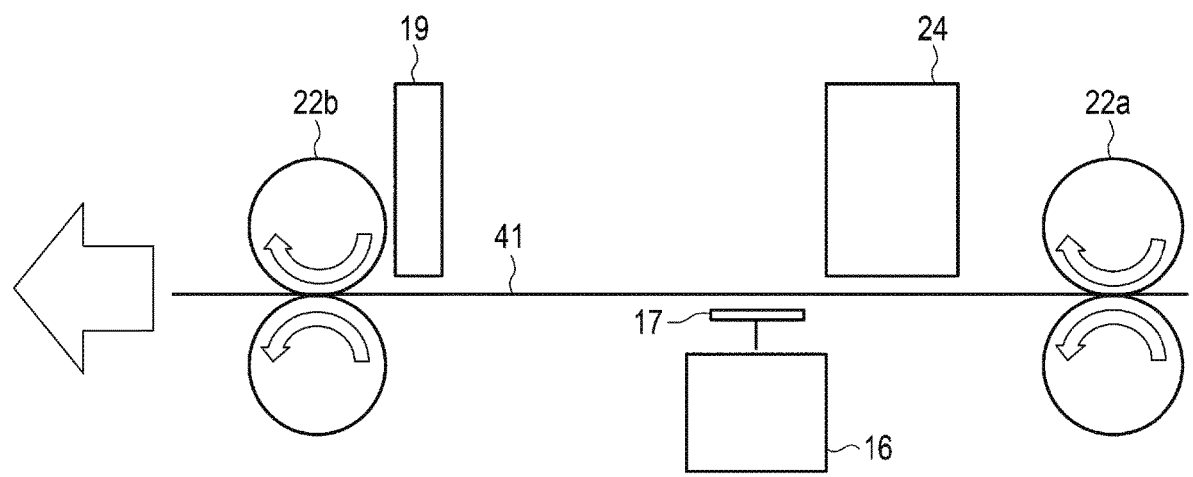

FIG. 2 is a diagram illustrating the positional relationship of the antenna 17 and the like. As illustrated in FIG. 2, the roller 22 is configured with rollers 22a and 22b. The roller 22a and the roller 22b are formed at predetermined intervals. A label roll paper 41 is transported from the roller 22a side to the roller 22b side. Herein, the roller 22a side is set to upstream, and the roller 22b side is set to downstream.

Each of the rollers 22a and 22b is configured with two rollers which interpose and transport the label roll paper 41.

The mark sensor 24 is formed downstream of the roller 22a. The mark sensor 24 detects a mark on the back surface of the label roll paper 41.

The antenna 17 is formed downstream of the mark sensor 24. The antenna 17 is formed at a position facing the mark sensor 24. That is, the antenna 17 is formed to be in contact with the front surface of the label roll paper 41.

The print head 19 is formed downstream of the antenna 17. The print head 19 is formed to be in contact with the front surface of the label roll paper 41. That is, the print head 19 forms an image on the front surface of the label included in the label roll paper 41.

The roller 22b is formed downstream of the print head 19.

Figure 3:
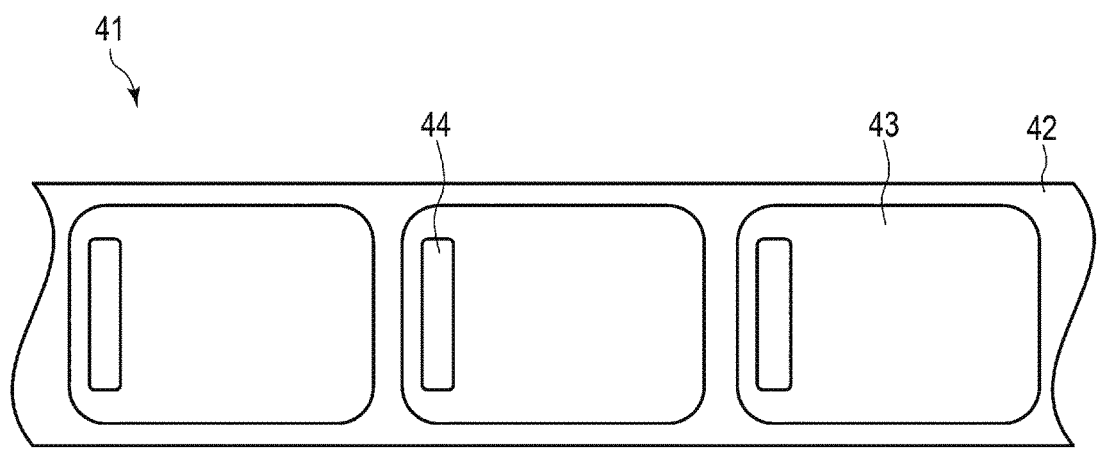
FIG. 3 is a diagram illustrating a configuration example of a label roll paper.
Figure 4:
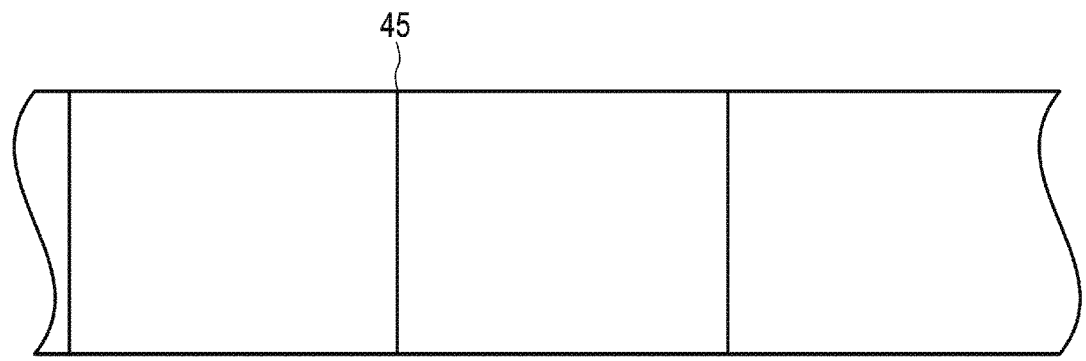
FIG. 4 is a diagram illustrating the configuration example of the label roll paper according to the embodiment.

Next, the label roll paper 41 will be described. FIG. 3 illustrates a configuration example of the front surface of the label roll paper 41. FIG. 4 illustrates a configuration example of the back surface of the label roll paper 41.

The label roll paper 41 is a belt including a plurality of labels 43 in a row. Herein, the label roll paper 41 is formed to extend in parallel with the long side of the label 43.

The label roll paper 41 is configured with a mount 42 and the labels 43.

The mount 42 supports the plurality of labels 43 in a row at predetermined intervals. For example, the mount 42 supports the labels 43 by being partially connected to the labels 43. For example, the mount 42 is made of a material such as paper, plastic, or vinyl.

The label 43 is a medium including the wireless tag 44 inside. The label 43 is formed in a rectangular shape. The label 43 is formed by stacking a plurality of layers. The label 43 includes the wireless tag 44 between the plurality of layers. For example, the label 43 is made of a material such as paper, plastic, or vinyl. The label 43 may be made of the same material as the mount 42 or may be made of a material different from the mount 42.

The label roll paper 41 includes a mark 45 on the back surface of the label roll paper. The mark 45 indicates the position of the label 43. The mark 45 is attached to each label 43. Herein, the mark 45 is attached to the start point of the label 43.

Figure 5:
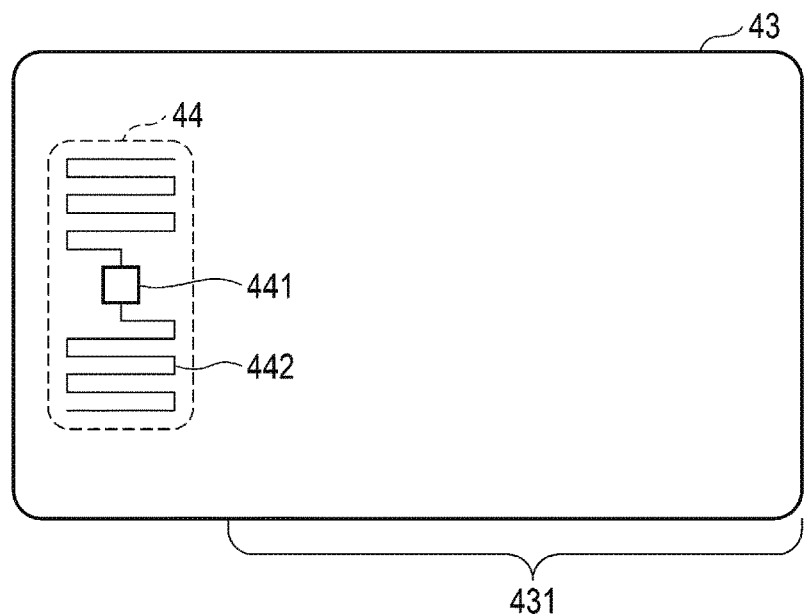
FIG. 5 is a diagram illustrating a configuration example of a label.

Next, the label 43 will be described. FIG. 5 illustrates a configuration example of the label 43. As illustrated in FIG. 5, the label 43 includes a wireless tag 44, a print area 431, and the like. The label 43 may have a configuration as needed other than the configuration illustrated in FIG. 5, or a specific configuration may be excluded from the configuration illustrated in FIG. 5.

The wireless tag 44 is disposed at a predetermined position of the label 43. In the example illustrated in FIG. 5, the wireless tag 44 is disposed on the left side of the label 43. The wireless tag 44 may be disposed on the right side of the label 43 or may be disposed in the center. The position where the wireless tag 44 is disposed is not limited to a specific configuration.

The wireless tag 44 is embedded between the plurality of layers constituting the label 43. At least one wireless tag 44 is embedded in one label 43. Predetermined data wirelessly from an external device is written in the wireless tag 44, and the wireless tag 44 transmits the predetermined data wirelessly to the external device.

Herein, the wireless tag 44 is an RFID. The wireless tag 44 is based on Generation-2 (GEN2).

As illustrated in FIG. 5, the wireless tag 44 includes an RFID chip 441, an antenna 442, and the like.

The RFID chip 441 controls the entire wireless tag 44. The RFID chip 441 will be described later.

The antenna 442 is an antenna for wirelessly communicating with an external device. The antenna 442 is also used to receive power from the external device. For example, the antenna 442 may be formed in a mesh shape in a predetermined area. The antenna 442 may be formed in an annular shape in a predetermined area.

The wireless tag 44 is activated (becomes operable) by being supplied with power or the like in a non-contact manner from an external device. The wireless tag 44 receives radio waves from the external device through the antenna 442 as a communication interface, a modulation-demodulation circuit, and the like. The wireless tag 44 generates and activates an operating power supply and an operating clock by a power supply unit driven by the radio wave.

When the wireless tag 44 is activated, the RFID chip 441 can communicate data with the external device through the antenna 442. The RFID chip 441 reflects and absorbs the radio waves by changing the impedance of the antenna 442.

For example, the RFID chip 441 receives an access password or the like from the reader-writer 16 or the like through the antenna 442 and establishes communication with the reader-writer 16. The RFID chip 441 transmits and receives predetermined data to and from the reader-writer 16 through the antenna 442. The configuration of the wireless tag 44 is not limited to a specific configuration.

The print area 431 is an area where various images are printed by the print head 19. The print area 431 may be configured with thermal paper or the like.

Figure 6:
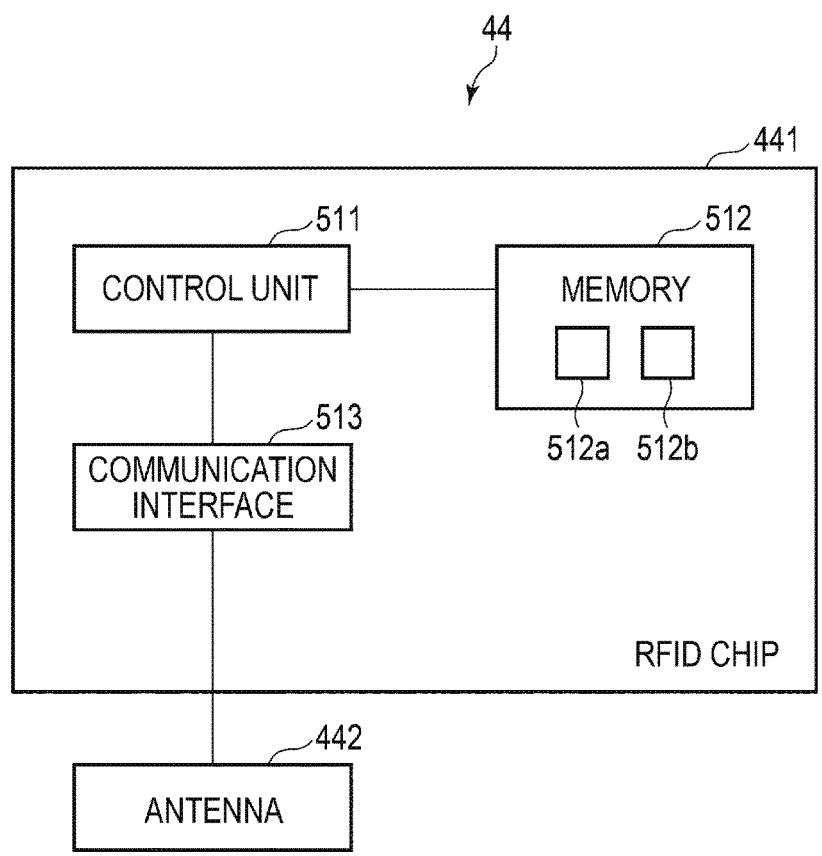
FIG. 6 is a block diagram illustrating a configuration example of an RFID chip.

Next, a configuration example of the wireless tag 44 will be described. FIG. 6 is a block diagram illustrating the configuration example of the wireless tag 44. As illustrated in FIG. 6, the wireless tag 44 includes the RFID chip 441, the antenna 442, and the like. The antenna 442 is as described above. The wireless tag 44 may have a configuration as needed in addition to the configuration illustrated in FIG. 6, or a specific configuration may be excluded from the configuration illustrated in FIG. 6.

The RFID chip 441 includes a control unit 511, a memory 512, a communication interface 513, and the like. The control unit 511 has a function of controlling the overall operations of the RFID chip 441. The control unit 511 may include an internal cache, various interfaces, and the like. For example, the control unit 511 implements various processes by using the data stored in the internal memory or the memory. The control unit 511 may be configured with a processor or the like. The control unit 511 may be configured with hardware such as a sequencer.

The memory 512 is a non-volatile memory to which data can be written. The memory 512 stores various data based on the operations of the control unit 511. The memory 512 may store control data and the like in advance according to the application of the wireless tag 44. The memory 512 may temporarily store data and the like being processed by the control unit 511.

The memory 512 includes a first storage area for storing an electronic product code (EPC) (first identifier) and a second storage area for storing a tag ID (TID) (second identifier). The EPC and the TID will be described later.

The communication interface 513 is an interface for communicating with an external device through the antenna 442. The communication interface 513 may include a power supply unit or the like for supplying power received from an external device.

Next, the EPC will be described.

The EPC is one of pieces of the data stored in the memory of the wireless tag being based on GEN2. The EPC is an ID for specifying the wireless tag 44. The EPC is an ID that can be rewritten by the user who uses the wireless tag 44. For example, the EPC is updated according to a command from the external device.

Next, the TID will be described.

The TID is one of pieces of the data stored in the memory of the wireless tag 44 being based on GEN2. The TID is an ID for uniquely specifying the wireless tag 44. The TID is an ID that cannot be rewritten by the user who uses the wireless tag 44. For example, the TID is stored in a storage area 512b when the wireless tag 44 is manufactured or the like.

The TID may be stored in the storage area 512b to be physically non-rewritable. The TID may be non-rewritable by software by an operating system (OS) or the like for controlling the control unit 511.

Next, the functions of the control unit 511 will be described.

The control unit 511 has a function of transmitting the EPC or the TID to the data writing device 1.

For example, the control unit 511 receives a command for acquiring the EPC through the antenna 442. When the command is received, the control unit 511 acquires the EPC from a storage area 512a. When the EPC is acquired, the control unit 511 transmits a response including the EPC to the data writing device 1 through the antenna 442.

The control unit 511 receives a command for acquiring the TID through the antenna 442. When the command is received, the control unit 511 acquires the TID from the storage area 512b. When the TID is acquired, the control unit 511 transmits a response including the TID to the data writing device 1 through the antenna 442.

Next, the functions implemented by the data writing device 1 will be described. The functions implemented by the data writing device 1 are implemented by the processor 111 executing a program stored in the internal memory, the memory 15, or the like.

First, the processor 111 has a function of determining the radio wave intensities of radio waves received from a plurality of the wireless tags 44. Herein, the processor 111 determines the radio wave intensities by simultaneously acquiring the EPCs from the plurality of wireless tags 44 based on GEN2.

The processor 111 drives the motor 21 to transport the label roll paper 41 to a predetermined position. For example, the processor 111 detects the mark 45 by using the mark sensor 24 to transport the label roll paper 41 to the predetermined position. When the label roll paper 41 is at the predetermined position, the reader-writer 16 can communicate with the plurality of wireless tags 44 through the antenna 17.

When the label roll paper 41 is transported to the predetermined position, the processor 111 transmits a command for acquiring the EPC to the plurality of wireless tags 44 through the reader-writer 16.

When the command is transmitted, the processor 111 receives responses including the EPC from the plurality of wireless tags 44 through the reader-writer 16. The processor 111 determines the radio wave intensities of the plurality of wireless tags 44 based on each received response or the like.

The processor 111 has a function of specifying the strongest radio wave intensity (R1) and the next strongest radio wave intensity (R2) among the acquired radio wave intensities.

When the radio wave intensities of the responses are acquired, the processor 111 sorts the radio wave intensities in ascending order. When the radio wave intensities are sorted in ascending order, the processor 111 specifies the strongest radio wave intensity and the next strongest radio wave intensity.

The processor 111 has a function of setting a reading threshold between R1 and R2.

The reading threshold is the radio wave intensity required to transmit and receive data to and from the wireless tag 44. That is, the processor 111 or the reader-writer 16 does not transmit and receive data to and from the wireless tag 44 having a radio wave intensity lower than the reading threshold.

For example, the processor 111 sets an average value of R1 and R2 as the reading threshold. For example, the processor 111 sets the reading threshold in the reader-writer 16.

If R1 and R2 are equal to each other, the processor 111 outputs, to the display device 12 or the like, an error indicating that there are a plurality of strongest radio wave intensities.

The processor 111 has a function of acquiring the TID from the wireless tag 44 based on the set reading threshold.

Herein, the processor 111 acquires the TID from one wireless tag 44 based on GEN2.

The processor 111 transmits a command for acquiring the TID to the wireless tag 44 through the reader-writer 16 by using the set reading threshold. When the command is transmitted, the processor 111 receives a response including the TID from the one wireless tag 44 through the reader-writer 16. That is, the processor 111 acquires the TID from the wireless tag 44 having a radio wave intensity exceeding the set reading threshold. That is, the processor 111 acquires the TID from the wireless tag 44 having the strongest radio wave intensity.

The processor 111 has a function of calculating and setting the writing position based on the acquired TID and the radio wave intensity.

The writing position is a position at which the antenna 17 is in contact with the label 43 when the reader-writer 16 writes data in the wireless tag 44. For example, the writing position is associated with a distance by which the processor 111 transports the label 43 after detecting the mark 45 when the reader-writer 16 writes the data in the wireless tag 44.

Next, an operation example of the data writing device 1 will be described. FIG. 7 is a flowchart illustrating the operation example of the data writing device 1.

First, the processor 111 of the data writing device 1 acquires the EPC from the plurality of wireless tags 44 (ACT 11). When the EPC is acquired, the processor 111 acquires radio wave intensities from the plurality of wireless tags 44 (ACT 12).

When the radio wave intensities are acquired, the processor 111 sorts the acquired plurality of radio wave intensities, for example, in ascending order (ACT 13). When the radio wave intensities are sorted (in ascending order), the processor 111 specifies the strongest radio wave intensity R1 and the next strongest radio wave intensity R2 (ACT 14).

When R1 and R2 are specified, the processor 111 determines whether R1 is equal to R2 (ACT 15). When it is determined that R1 is not equal to R2 (ACT 15, NO), the processor 111 sets a reading threshold between R1 and R2 (ACT 16).

When the reading threshold is set, the processor 111 acquires one TID based on the set reading threshold (ACT 17).

If it is determined that R1 is equal to R2 (ACT 15, YES), the processor 111 outputs an error indicating that there are a plurality of strongest radio wave intensities (ACT 18).

When one TID is acquired based on the set reading threshold (ACT 17) or when an error is output (ACT 18), the processor 111 ends the operation.

The processor 111 may directly transport the label 43 instead of the label roll paper 41. For example, the processor 111 may extract and transport the label 43 from a supply unit that stores a plurality of the labels 43.

The processor 111 may not print an image on the label 43.

When writing data in the wireless tag 44, the processor 111 may return the label 43 to the upstream.

The antenna 17 may be movable.

The processor 111 may set the reading threshold based on R1. For example, the processor 111 may set R1 or a value smaller than R1 (for example, a value obtained by subtracting a predetermined value from R1 or a value obtained by adding a predetermined ratio to R1) as the reading threshold.

The data writing device configured as described above acquires the radio wave intensities from the wireless tags by acquiring the EPCs from the plurality of wireless tags in the communicable range. The data writing device specifies the strongest radio wave intensity and the next strongest radio wave intensity among the acquired plurality of radio wave intensities. The data writing device sets a reading threshold between the strongest radio wave intensity and the next strongest radio wave intensity.

The data writing device obtains the TIDs from one wireless tags based on the set reading threshold. As a result, even if there are a plurality of wireless tags provided with the same EPC in the communicable range, the data writing device can specify the TID of the wireless tag having the strongest radio wave intensity among the plurality of wireless tags.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data writing device comprising:
   a reader configured to receive a radio wave from a wireless tag that stores a first identifier and a second identifier, the reader measuring a radio wave intensity of the radio wave received from the wireless tag; and
   a processor configured to:
   determine the radio wave intensities of the radio waves received from a plurality of the wireless tags by acquiring the respective first identifiers from the plurality of wireless tags through the reader,
   set a reading threshold between a strongest radio wave intensity and a next strongest radio wave intensity among the radio wave intensities of the radio waves received from the plurality of wireless tags, and acquire a second identifier from one of the plurality of wireless tags, wherein the one of the plurality of wireless tags has a radio wave intensity exceeding the set reading threshold through the reader, wherein the first identifier is an electronic product code and the second identifier is an identifier for specifying the wireless tag.

2. The data writing device according to claim 1, wherein the processor sets an average value of the strongest radio wave intensity and the next strongest radio wave intensity as the reading threshold.

3. The data writing device according to claim 1, wherein the reader is operable to write on the wireless tag and the processor calculates and sets a writing position at which the reader writes data in the wireless tag based on the acquired second identifier.

4. The data writing device according to claim 3, further comprising an antenna for wirelessly communicating with the wireless tag, wherein the antenna emits an unmodulated wave to the wireless tag.

5. The data writing device according to claim 4, wherein the writing position is a position at which the antenna is in contact with a label of the wireless tag when the reader writes data in the wireless tag based on the acquired second identifier.

6. A method for processing data by a processor, the method comprising:
  receiving, from a plurality of wireless tags, a plurality of radio waves, each of the plurality of wireless tags storing a first identifier and a second identifier;
  determining, by the processor, radio wave intensities of the plurality of radio waves received from the plurality of the wireless tags, wherein determining the radio wave intensities comprises:
    acquiring the first identifiers from the plurality of wireless tags through a reader, and
    measuring the radio wave intensities of the radio waves received from the plurality of wireless tags;
  setting, in the processor, a reading threshold between a strongest radio wave intensity and a next strongest radio wave intensity among the radio wave intensities of the radio waves received from the plurality of wireless tags; and
  acquiring a second identifier from one of the plurality of the wireless tags having a radio wave intensities exceeding the set reading threshold through the reader,
  wherein the first identifier is an electronic product code and the second identifier is an identifier for specifying the wireless tag.

7. The method of claim 6, further comprising writing data in the one of the plurality of the wireless tags based on the second identifier acquired.

8. The method of claim 7, wherein writing data comprises transmitting, via an antenna connected to the processor, the data to the one of the plurality of the wireless tags.

9. The method of claim 6, wherein setting the reading threshold further comprises sorting the radio wave intensities of the radio waves in an order.

10. The method of claim 6, further comprising determining a writing position at which data is written in the wireless tag based on the acquired second identifier.

11. The method of claim 10, wherein the writing position is a position at which an antenna connected to the processor is in contact with a label of the wireless tag when the reader writes data in the wireless tag based on the acquired second identifier.

12. A system for determining a writing position for a plurality of wireless tags to facilitate data processing, the system comprising:
  a motorized conveyer carrying the plurality of wireless tags, each of the plurality of wireless tags having a first identifier and a second identifier;
  a reader-writer adjacent the motorized conveyer, the reader-writer operable to receive radio waves from one or more of the plurality of wireless tags carried nearby by the motorized conveyer, the reader-writer configured to read and write data on each of the one or more of the plurality of wireless tags nearby; and
  a controller communicatively connected with the motorized conveyer and the reader-writer, wherein the controller includes a processor configured to:
    acquire a first identifier from one of the plurality of wireless tags via the reader-writer;
    determine a corresponding radio wave intensity of the acquired first identifier from one of the plurality of wireless tags;
    set a reading threshold based on the determined radio wave intensity; and
    acquire a second identifier from one of the plurality of wireless tags whose radio wave intensity exceeds the set reading threshold,
  wherein the first identifier is an electronic product code and the second identifier is an identifier for specifying the wireless tag.

13. The system of claim 12, wherein the processor is further configured to sort a plurality of radio wave intensities corresponding to a plurality of first identifiers of the plurality of wireless tags and to set the reading threshold below a strongest radio wave intensity and above a next strongest radio wave intensity of the plurality of radio wave intensities.

14. The system of claim 13, wherein the processor sorts the plurality of radio wave intensities in an ascending order.

15. The system of claim 13, wherein the reading threshold is set as an average of the strongest radio wave intensity and the next strongest radio wave intensity.

16. The system of claim 12, wherein each of the plurality wireless tags includes a memory storing the first identifier and the second identifier, and a communication interface configured to transmit signals of the first identifier and the second identifier to the processor via the reader-writer.

17. The system of claim 16, further comprising an antenna coupled with the reader-writer for communication with the communication interface of each of the plurality wireless tags, wherein the reader-writer is configured to write data to the plurality of the wireless tags via the antenna.

18. The system of claim 12, further comprising:
  a mark sensor transmitting a predetermined signal to the controller when a mark of one of the plurality of wireless tags is read; and
  a print head operable to print an image on a label including one of the plurality of wireless tags.

* * * * *